Oct. 3, 1933.     J. SAINT-GERMAIN     1,929,293
ELECTRICAL SWITCH GEAR
Filed May 25, 1931
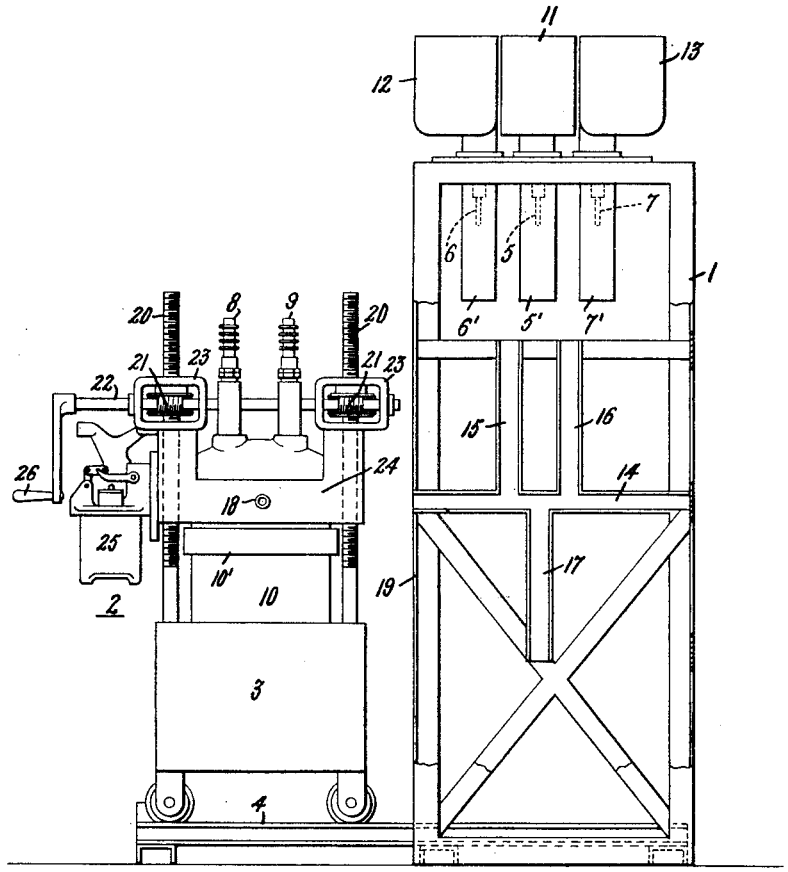
Inventor:
Jacques Saint-Germain,
by Charles E. Mullen
His Attorney.

Patented Oct. 3, 1933

1,929,293

UNITED STATES PATENT OFFICE 1,929,293

ELECTRICAL SWITCH GEAR

Jacques Saint-Germain, Paris, France, assignor to General Electric Company, a corporation of New York Application May 25, 1931, Serial No. 539,663, and in France July 24, 1930

5 Claims. (Cl. 175—298)

My invention relates to electrical switchgear, more particularly to switchgear of the draw-out type in which a movable switch unit is operated selectively to connect a branch circuit to alternate circuits.

The principal object of my invention is the provision of improved switchgear of the draw-out type which shall insure selective connection of a switch unit with a plurality of circuit connections and which shall be simple and rugged in construction.

My invention will be more fully set forth in the following description referring to the accompanying drawing, and the features of novelty which characterize my invention will be pointed out with particularity in the claims annexed to and forming a part of this specification.

Referring to the drawing, the single figure thereof illustrates an elevational view, partly in section, of electrical switchgear embodying my invention in the withdrawn and inoperative position thereof.

The electrical switchgear as illustrated comprises a stationary frame structure 1 forming a cubicle-like framework open at one side for receiving the movable switch unit 2. The switch unit 2, including the truck 3, is horizontally movable along the track 4 into the stationary frame 1 where it is subsequently moved vertically in a manner hereinafter described selectively to connect a connection 5 of a branch circuit to one of the connections 6 and 7 of alternate circuits which are mounted on the upper part of the frame 1.

In the present instance the individual connections 5, 6 and 7 comprise stationary contacts mounted within the tubular insulating shields 5', 6' and 7', respectively, open at the lower ends for receiving coacting socket contacts 8 and 9 carried by the circuit breaker 10 comprising part of the switch unit 2. The connection 5, which is suitably insulated from the metallic frame 1, connects with a branch circuit, as a feeder, (not shown) suitably insulated and mounted within the housing 11. The connections 6 and 7 connect in a similar manner to alternate circuits, as main and auxiliary bus bars, (not shown) likewise suitably insulated and mounted within the housings 12 and 13 respectively.

The cooperation of a movable switch unit with a feeder and main and auxiliary bur-bars is well known, the feeder being transferred from one bus to the other by opening the switch and disconnecting the same from the feeder and bus from which the connection is to be transferred and bodily moving the switch so as to connect the feeder with the other bus. It shall be understood of course that suitable interlocking means are provided for insuring tripping of the circuit breaker before the disconnecting operation thereof so that the circuit will not be broken or made at the disconnecting contacts. Since various forms of interlocking mechanism applicable to switchgear of the present type are well known in the art, and since my invention does not depend upon any particular type of interlocking means, the same has been omitted from the drawing and description in the interest of clearness.

For the purpose of insuring proper selective connection of the switch unit with the circuits above referred to and for preventing movement of the switch unit into the frame to cause damage to the circuit connections, I have provided restraining and guiding means for the switch unit comprising structure carried by the frame 1 forming a horizontal groove or channel section 14 spaced a predetermined distance below the circuit connections, a pair of spaced vertical grooves 15 and 16, and a depending vertical groove 17 offset with respect to the vertical grooves 15 and 16. As clearly illustrated in the drawing the horizontal and vertical grooves are continuous and interconnecting and are arranged to receive a member, as a roller 18, carried by the switch unit 2, thereby guiding and restricting movement of the switch unit to predetermined paths. The width of the switch unit bears such relation to the width of the frame 1 that the roller 18 engages a channel strip 19 at the open end of the frame 11 unless the circuit breaker 10 is in such position that the roller 18 is in horizontal alinement with the groove 14. In this position the truck 3 is rolled into the frame 1, the roller 18 sliding within the groove 14 during its horizontal movement. It will therefore be noted that the contacts 8 and 9 carried by the circuit breaker are a suitable distance below the insulating shields of the circuit connections so that damage to the insulating shields or circuit connections is precluded by movement of the switch unit into the frame.

Vertical movement of the circuit breaker 10 with respect to the truck 3 may be effected in any suitable manner and in the present instance is produced by a worm and screw arrangement comprising a pair of vertical screws 20 carried by the truck 3 coacting with a pair of worm gears 21 driven by the operating shaft 22. The operating shaft 22 is carried by the bearing members 23 which in turn support the yoke member 24 supporting the circuit breaker 10. Likewise supported by the yoke is the circuit breaker operating mechanism 25 for operating the circuit breaker in a well known manner. Accordingly, when the operating shaft 22 is rotated in either direction by the handle 26 the yoke 24, and consequently the circuit breaker and its operating mechanism, are moved in a corresponding vertical direction upon the stationary screws 20.

When the circuit breaker 10 is raised by its elevating mechanism to connect the feeder connection 5 with the desired bus connection, it will be apparent that the roller 18 restricts vertical movement of the circuit breaker to either the grooves 15 or 16, thereby limiting the circuit breaker disconnecting contacts to selective engagement with the bus contacts 5 and 6 or 5 and 7. When the truck 3 is horizontally positioned so that the roller 18 is in alinement with the groove 15 for example, the circuit breaker may be elevated causing engagement of the circuit breaker disconnecting contacts 8 and 9 with the contacts 6 and 5 respectively, thereby connecting the main bus through the circuit breaker with the feeder circuit. When the feeder is to be transferred to the auxiliary bus, the circuit breaker, after the tripping operation, is lowered until the roller 18 reaches the horizontal groove 14 whereupon the truck 4 is moved horizontally until the roller 18 is in alinement with the groove 16. The circuit breaker is thereupon elevated in a similar manner to connect the feeder contact 5 with the auxiliary bus contact 7.

In the event that it is desired to lower the circuit breaker 10 to the bottom of the frame 1 and remove the cover structure for inspection or the like, the switch unit is moved so that the roller 18 is in alinement with the groove 17 and the circuit breaker thereupon lowered until it rests upon the rails 4. The cover of the breaker may thereupon be unbolted at the flange 10′, the bolted connection (not shown) securing the circuit breaker tank to the cover structure. Subsequent elevation of the cover structure permits inspection of the circuit breaker whereas the offset position of the groove 17 with respect to the grooves 15 and 16 prevents elevation of the cover structure beyond the groove 14, thereby preventing improper contact with the bus and feeder connections.

The guiding grooves are illustrated for the purpose of clearness on but one side of the frame 1, it of course being understood that the guiding structure and the cooperating roller 18 may be symmetrically arranged on opposite sides of the switchgear.

It should be understood that my invention is not limited to specific details of construction and arrangement thereof herein illustrated, and that changes and modifications may occur to one skilled in the art without departing from the spirit of my invention.

What I claim as new and desire to secure by Letters Patent of the United States is:

1. Electrical switchgear of the draw-out type comprising stationary structure, connections to alternate circuits and to a branch circuit mounted on said structure, a switch unit movable into and out of said structure and in a vertical direction selectively to connect one of said alternate circuits with said branch circuit, and guiding means mounted on said stationary structure cooperating with said switch unit preventing movement of said unit into said structure when the switch unit is in other than a predetermined position with respect to said circuit connections, said guiding means being continuous selectively to guide said switch unit to connect said branch circuit with one of said alternate circuits.

2. Electrical switchgear of the draw-out type comprising a stationary frame, connections for alternate circuits and for a branch circuit carried by the upper part of said frame, a switch unit including a truck horizontally movable into and out of said frame, means carried by said truck effecting vertical movement of a switch with respect thereto, guiding means on said frame preventing movement of said switch unit into said frame when the switch is at other than a predetermined height with respect to said circuit connections and means continuous with the aforesaid guiding means limiting upward vertical movement of said switch to selective engagement with a branch circuit connection and one of said alternate circuit connections.

3. Electrical switchgear comprising a stationary frame having mounted thereon individual connections for alternate circuits and for a branch circuit, a switch unit horizontally movable into and out of said frame and in a vertical direction selectively to connect said branch circuit with one of said alternate circuits, guiding means restricting said switch unit to said selective connection including structure mounted on said frame forming a horizontal groove a predetermined distance below said connections admitting said switch unit to said frame and a pair of vertical grooves continuous with said horizontal groove, and a member carried by said switch unit arranged to be in sliding engagement with said structure within said grooves.

4. In electrical switchgear including a stationary frame having individual connections for main and auxiliary buses and a feeder circuit mounted thereon, and a switch unit movable horizontally into said frame and vertically selectively to engage the feeder circuit connection and one of said bus connections, guiding means for said switch unit comprising channel structure mounted on said frame at a side thereof, said channel structure forming a horizontal groove and a pair of spaced vertical grooves continuous therewith, and a roller carried by said switch unit arranged to engage said frame and prevent further inward movement of the switch unit except when the roller is in a position to enter said horizontal groove, upper vertical movement of said roller being limited to said vertical grooves insuring selective connection of said feeder circuit to one of said bus circuits by said switch unit.

5. Electrical switchgear comprising a stationary frame having individual connections for alternate circuits and a branch circuit mounted thereon, a switch unit including a circuit breaker and truck and means moving said circuit breaker vertically with respect to said truck, said circuit breaker being movable horizontally into and out of said frame and vertically selectively to connect said branch circuit with one of said alternate circuits, means guiding horizontal and vertical movement of said circuit breaker within said frame comprising structure forming a horizontal groove spaced a predetremined distance below said circuit connections, a pair of spaced vertical grooves and a vertical depending groove offset with respect to said pair of vertical grooves, the aforesaid grooves being interconnecting, and a member carried by said switch unit slidable within said grooves arranged so that movement of said circuit breaker into said frame is prevented by said frame except when said member is in position to enter said horizontal groove, said pair of vertical grooves guiding vertical movement of said circuit breaker and insuring said selective connection and said depending groove permitting lowering of the circuit breaker to the bottom of the frame while restricting the same to limited upward vertical movement.

JACQUES SAINT-GERMAIN.